Figure 1:
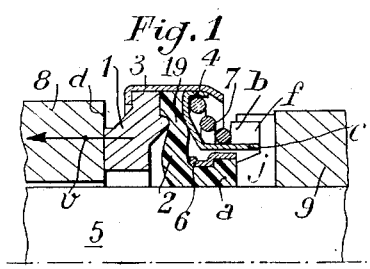

Jan. 23, 1962 M. AMIRAULT ETAL 3,018,112
SEALING DEVICES BETWEEN A ROTATING PART AND A FIXED PART
Filed July 31, 1957 3 Sheets-Sheet 1

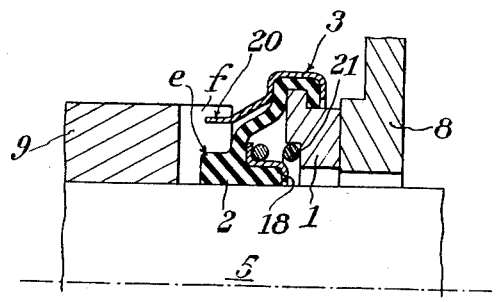
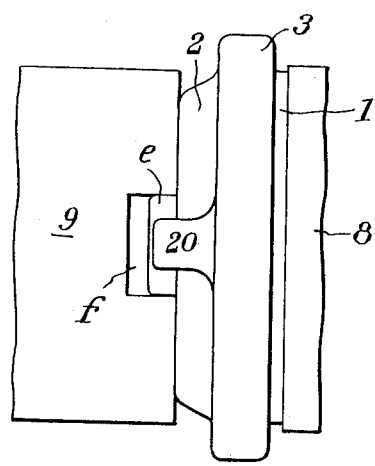

United States Patent Office 3,018,112
Patented Jan. 23, 1962

3,018,112
SEALING DEVICES BETWEEN A ROTATING
PART AND A FIXED PART
Maxime Amirault, 4 Impasse des Saubergeaux, Antony, France, and Paul Destoumieux, 46 Blvd. Inkermann, Neuilly-sur-Seine, France
Filed July 31, 1957, Ser. No. 675,402
Claims priority, application France Aug. 14, 1956
5 Claims. (Cl. 277—42)

An object of the present invention is an improvement in driving means and angular connection means of sealing joints between a rotating part and a fixed part, commonly called "mechanical sealing devices with side friction" or again "with axial or frontal friction."

At the present time, these joints generally consist of a friction ring connected in a tight manner and associated angularly with one of the elements to be sealed, but movable axially with respect to the latter, so as to be pushed by a spring against a trued face rigid with the other element of the mechanism to be sealed off. The tight connection of said ring with the element to which it is connected is frequently effected by a diaphragm of elastic material such as rubber which, at the same time, ensures the angular connection with resiliency. This arrangement gives complete satisfaction in normal operation, in which the frictional torque to be transmitted by the diaphragm does not exceed its elastic limit, but it sometimes happens that, due to sticking phenomena which occur during rest periods between the two rubbing parts, the torque necessary for the unsticking exceeds the limit of resistance of said diaphragm and that the latter breaks. To obviate this risk, a positive angular connection is frequently used between the ring movable axially and the element with which it is connected, constituted for instance, by a system of splines, thus limiting the function of the diaphragm to that of a tight connection; this solution, however, due to the friction between splines, does not always give a good operation in rotation; due to the fact of axial or even radial vibrations, spacings occur between the two faces in contact, which show up, unretrievably by leakage, and in addition beats and vibrations increase the wear of the friction faces.

An object of the present invention is an improvement to sealing devices between a rotating part and a fixed part with a positive connection between the friction ring of the joint and the supporting element in order to avoid the above-mentioned drawbacks.

It is characterized chiefly by a mixed drive, ensured on the one hand by the diaphragm, on elastic means for low torques, i.e. during rotation and, on the other hand, by positive means for large torques. The strength of the diaphragm is, indeed, quite sufficient in rotation, i.e. with the slipping friction coefficient also called dynamic friction, which is always low, and the positive drive only has to act upon and overcome the large torques which occur only on starting, due to sticking phenomena.

In consequence, the device as imagined does not modify or hinder the elasticity of the connection in the axial direction during rotation.

There will be described in greater detail, hereinafter, and by way of example only, a few forms of embodiment with reference to FIGURES 1 to 12 of the appended drawing, wherein these joints are shown in section.

Figure 3:
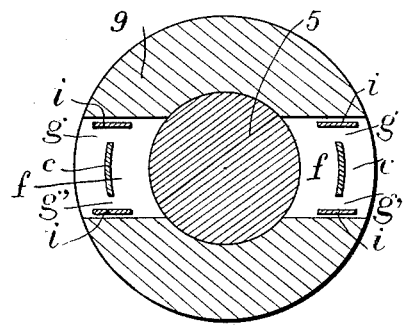
Figure 2:
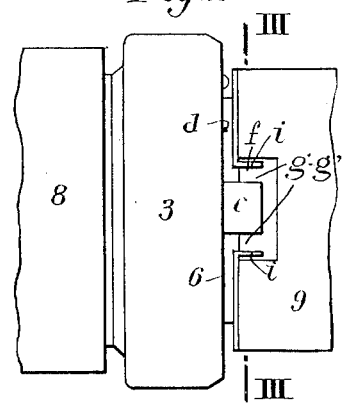

FIGURES 1, 2 and 3 show respectively, in axial section, in plan view and in cross section along III—III of FIGURE 2, a joint rotating with the shaft and designed in accordance with the invention. It comprises a friction ring of a material having a low friction coefficient, associated at its periphery with a rubber diaphragm 2, through a metal box 3, crimped on a crosspiece 4; said diaphragm offers, in its central portion, a flange $a$ forced on the shaft 5 of the apparatus to be sealed, and clamped on said shaft by means of a ring 6; between a radial extension $b$ of said ring and the cross piece 4, a frustoconical coil spring 7 is inserted; bearing on the extension $b$ of the ring 6, said spring 7 pushes, parallel to the shaft and in the direction of the arrow $v$ the friction ring 1 on a trued face $d$ of the casing to be sealed; in accordance with the invention, the cross piece 4 carries, in its inner zone, one or more extensions $c$ placed parallel with the shaft which can slide axially inside a slot $f$ provided in the ring 6 with a large angular play $gg'$.

In normal operation, the rotating shaft drives, in its motion, by means of the diaphragm alone, all the parts of the joint and the friction ring 1 glides circularly over the face $d$ of the casing 8; during that period, the resistant torque caused by the friction of the parts 1 and 8 is low, it being a slipping friction, as already indicated, and the extension $c$ is held with respect to the slot $f$ at its middle position. On the contrary, when starting, due to either the static friction coefficient which is always higher than the dynamic friction, or a sticking between the parts 1 and 8, the resistant torque being large, the web 19 of the diaphragm 2 is subjected to a circular torsion, and the extension $c$ comes in contact on one of the ends of the slot $f$; it is at that time driven positively by the ring 6 which, by its vigorous clamping of the shaft, is practically associated with the latter. In accordance with the invention, to make the ring still better associated with the shaft 5, tongues $i$ bent back parallel and radially with respect to the shaft, enter a slot $j$ provided radially on the shoulder 9 associated with the shaft 5. It will be noted further that these tongues offer a large contact area to the extension $c$ of the part 4 thus decreasing the risks of hammering and hooking between these two parts.

In accordance with the invention, it will be possible, obviously, to increase the number of slots and corresponding extensions; for balancing reasons, this number will be at least 2, in principle, as shown in FIGURE 3.

Figure 4:
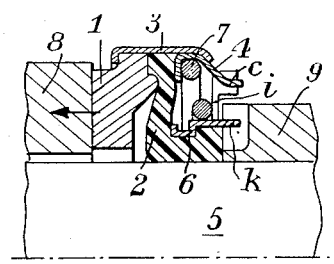
Figure 5:
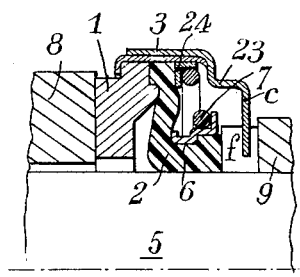
Figure 6:
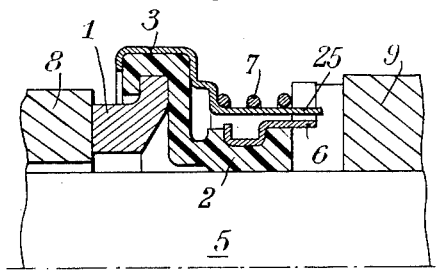

FIGURES 4, 5 and 6 are modifications of the above embodiment seen in axial section only.

In FIGURE 4, the rubber diaphragm 2 is associated with the friction ring 1 by means of the metal box 3 crimped on a peripheral cross piece 4 which comprises a driving extension $c$ and a ring 6 comprising a slot with an ear $i$ and a positioning tongue $k$, held away from the cross piece by the spiral spring.

In FIGURE 5, an additional part 23 which comprises an extension $c$ entering radially a slot $f$ of the hub 9 is secured on the box 3, and the spring 7 is applied between the ring 6 and a cross piece 24.

In FIGURE 6, the box 3 offers an extension 25 placed parallel with the extension of the ring 6 and pushed axially by the spring 7.

Figure 7:
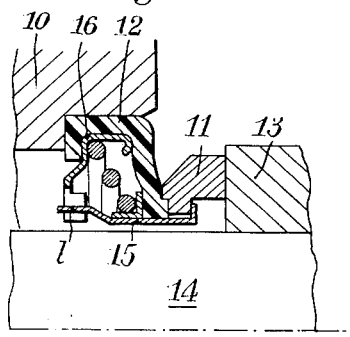
Figure 8:
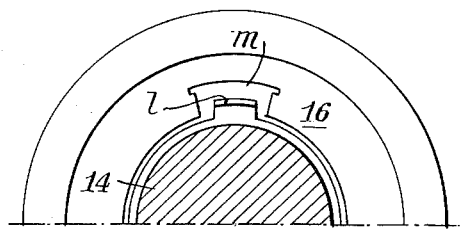
Figure 9:
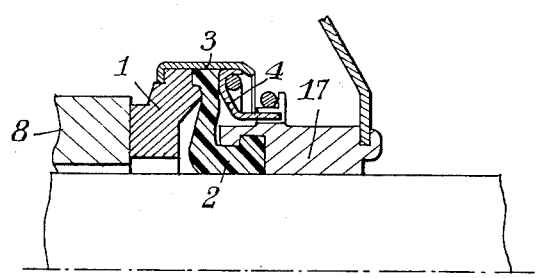

FIGURES 7 and 8 represent, in axial section, and at one end, a joint secured at its periphery with one of the parts to be sealed off, for instance the casing 10, the friction ring of which 11, which is associated with the inner zone of the diaphragm 12, rubs on a shoulder 13 associated with the shaft 14. An extension $l$ of the ring 15 is placed and can slide in the axial direction inside the slot $m$ provided in the inner ring 16. The operation of this arrangement is similar to that described above for the joint represented in FIGURES 1, 2 and 3.

Figure 10:
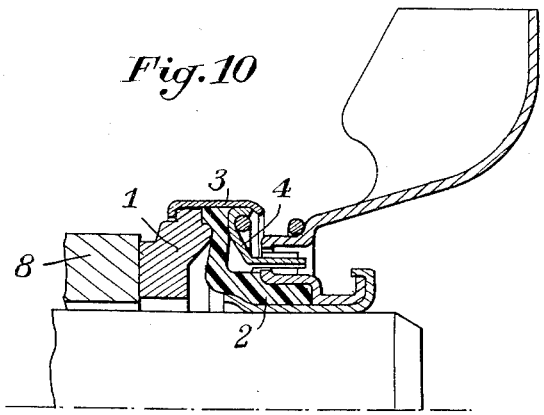

It should be understood that without modifying the principle of the invention, mixed drives may be realized, different from those already described. For instance with any number of driving elements, or by means of splines, or dogs offering a sufficient angular play, etc. The rubber diaphragm may comprise bosses, fitting into recesses for ensuring an angular positioning with the shaft or the other part with which it is connected, more accurate, or again by using an elastic means other than the diaphragm, for instance a system of a metal spring or of the rubber type. This positive drive may also be combined with another element of the machine on which the joint is mounted, for instance: a hub 17 (FIGURE 9) a casing, a journal, a bearing cage or again a turbine as shown in FIGURE 10.

An arrangement in which the diaphragm is fixed in rotation on one of the two parts in relative rotation by bosses of said diaphragm engaged with recesses in that part, is shown in FIGURES 11 and 12 which are respectively a half axial section and a plan view of that arrangement. In the shoulder 9, associated with the shaft 5 radial recesses *f* are cut which are engaged by bosses *e* of the diaphragm 2 which complete the action of the fastening ring 18 for associating the diaphragm and shaft in rotation. These recesses *f* also serve as housings for radial extensions 20 of the box 3 which ensure a rigid drive of the friction ring 1 for high torques, similarly to the extensions 25 of the box 3 in FIGURE 6. In that arrangement of FIGURES 11 and 12 the spring 21 is placed in front of the diaphragm, towards the second rotating part 8, and by one end pushes the diaphragm into the recesses *f* and by its opposite end presses directly on the friction ring 1.

What we claim is:

1. A sealing joint between two coaxial relatively rotatable parts, comprising an annular elastic diaphragm having two coaxial circular contours, means fixedly mounting a first one of said contours on a first one of said parts to rotate therewith, a friction ring mounted on the second of said contours, spring means urging said friction ring into sealing engagement with the second of said parts, an annular casing surrounding said second contour and rotatable with said second contour and sealing ring, spaced abutments on said first part and a tongue on said casing interposed between and normally spaced from both of said abutments whereby said friction ring is normally rotationally connected with said first part only by said elastic diaphragm, said tongue being engageable with one or another of said abutments when the reaction torque on said diaphragm exceeds a selected value to provide temporarily a positive driving connection between said first part and said friction ring.

2. A sealing joint according to claim 1, in which said casing clamps said friction ring on said second contour.

3. A sealing joint according to claim 1, in which said means rigidly mounting said first contour on said first part comprises a metal clamping ring in which said abutments are provided on said clamping ring.

4. A sealing joint between two coaxial relatively rotatable parts comprising an annular flexible diaphragm of elastomeric material having two coaxial circular contours, means fixedly mounting a first one of said contours on a first one of said parts to rotate therewith, said second part having a radially extending sealing surface, a friction ring, an annular casing clamping said friction ring on said second contour, spring means urging said friction ring axially into sealing engagement with said sealing surface, a plurality of circumferentially spaced abutments on said first part, a plurality of projections on said casing disposed between said abutments and normally spaced circumferentially therefrom whereby said friction ring is normally rotationally connected with said first part only by said flexible diaphragm, said projections being engageable with said abutments only when the reaction torque on said diaphragm exceeds a selected value to provide temporarily a positive driving connection between said first part and said friction ring.

5. A fluid seal of the type adapted to be fitted inside a case and to receive a rotary shaft, which comprises a shoulder formed integrally with the shaft extending outside said case and having radial notches formed therein, an annular elastic diaphragm having a sleeve-shaped central portion formed with projections extending longitudinally on one side of said sleeve and a smooth peripheral portion, said central portion of said elastic diaphragm being threaded on said shaft so that said longitudinally extending projections are engaged in said radial notches, a clamping ring threaded on said shaft and engaging the case-facing side of said central portion of the elastic diaphragm, a friction ring, a casing surrounding the smooth peripheral portion of said elastic diaphragm and rigidly securing said friction ring against said peripheral portion, a spring bearing against said clamping ring and urging said friction ring for engagement with said case around said shaft, and lugs formed integrally on said casing, each of said lugs extending with a certain clearance on the opposite case side, within one of said radial notches of the shaft shoulder above said projections already engaged in said notch.

References Cited in the file of this patent

UNITED STATES PATENTS

| | | |
|---|---|---|
| 1,931,724 | Fageol et al. | Oct. 24, 1933 |
| 2,311,494 | Vedovell | Feb. 6, 1943 |
| 2,342,955 | Meyer | Feb. 29, 1944 |
| 2,379,868 | Curtis | July 10, 1945 |
| 2,395,095 | Brady | Feb. 19, 1946 |
| 2,432,694 | Snyder | Dec. 16, 1947 |
| 2,443,151 | Schmitz | June 8, 1948 |
| 2,521,137 | Vedovell | Sept. 5, 1950 |
| 2,765,186 | Wright | Oct. 2, 1956 |